(12) United States Patent
Fang et al.

(10) Patent No.: US 9,471,622 B2
(45) Date of Patent: Oct. 18, 2016

(54) SCM-CONSCIOUS TRANSACTIONAL KEY-VALUE STORE

(75) Inventors: Ru Fang, Beijing (CN); Bin He, San Jose, CA (US); Hui-I Hsiao, Saratoga, CA (US); Chandrasekaran Mohan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1173 days.

(21) Appl. No.: 13/460,013

(22) Filed: Apr. 30, 2012

(65) Prior Publication Data

US 2013/0290655 A1    Oct. 31, 2013

(51) Int. Cl.
*G06F 12/00* (2006.01)
*G06F 13/00* (2006.01)
*G06F 13/28* (2006.01)
*G06F 17/30* (2006.01)

(52) U.S. Cl.
CPC ................ *G06F 17/30377* (2013.01)

(58) Field of Classification Search
CPC ............................................... G06F 17/30377
USPC ........................................................ 711/156
See application file for complete search history.

(56) References Cited

U.S. PATENT DOCUMENTS 5,893,155 A * 4/1999 Cheriton ............. G06F 11/1407
                                                      711/141
7,889,544 B2    2/2011 Chow et al.

2010/0169602 A1    7/2010 Hulbert et al.
2010/0169708 A1    7/2010 Rudelic et al.
2010/0211737 A1*   8/2010 Flynn ................. G06F 3/0616
                                                      711/114
2011/0167197 A1    7/2011 Leinwander

OTHER PUBLICATIONS

Eilert et al. "Phase Change Memory: A New Memory Enables New Memory Usage Models", IEEE International Memory Workshop, (May 2009), pp. 1-2.
Qureshi et al "Scalable High Performance Main Memory System Using Phase-Change Memory Technology", SIGARCH Computer Architecture News, vol. 37, pp. 24-33.
Fang et al. "High Performance Database Logging Using Storage Class Memory", Proceedings of the 2011 IEEE 27th International Conference on Data Engineering, (Jun. 2011), pp. 1221-1231.

* cited by examiner

*Primary Examiner* — Charles Rones
*Assistant Examiner* — Sidney Li
(74) *Attorney, Agent, or Firm* — Jeffrey T. Holman

(57) ABSTRACT

Embodiments of a system are described. In one embodiment, the system is a device for performing operations and supporting transactions. The device is configured to receive a transaction comprising a command and data. The device writes the data to a transaction manager on a persistent memory device. The transaction manager also maintains a status of the transaction and reference to entries within memory that are manipulated by the transaction. The device also creates an in-memory log of the transaction in a first hash directory. The device then commits a copy of the first hash directory to a second hash directory maintained on a persistent memory device.

14 Claims, 6 Drawing Sheets

SCM-CONSCIOUS TRANSACTIONAL KEY-VALUE STORE

BACKGROUND

Traditional database systems rely on disk storage for persistency of data. In many database management systems and other computing environments, transactions are received and processed on volatile memory, such as Random Access Memory (RAM), Static Random Access Memory (SRAM) or Dynamic Random Access Memory (DRAM), and then committed to memory on a disk or other storage device. Because the speed of conventional storage devices is magnitudes slower than DRAM and other volatile memory, significant efforts have been put into optimization of disk performance and the writing of data into storage. This adds significant code complexity to database management systems and continues to be a bottleneck in speed for many database applications.

Another problem with traditional database systems is the unnecessary and repetitive writing and rewriting of data into storage. Because many conventional database management systems lack the organization and space management necessary to prevent these unnecessary writes and rewrites of data, memory cells break down over time and cause inaccuracies in data in older database management systems.

Another problem with many traditional database systems is how to handle system failures that may happen during processing of a transaction and the committal of that transaction to storage. Many conventional database management systems incorporate a logging procedure for tracking transactions, which suffer from many of the same latency problems of committing transactions to disk memory. Consequently, processing and logging transactions is frequently a key inhibitor for high performance transaction processing.

SUMMARY

Embodiments of a system are described. In one embodiment, the system is a device for performing operations and supporting transactions. The device is configured to receive a transaction comprising a command and data. The device writes the data to a transaction manager on a persistent memory device. The transaction manager also maintains a status of the transaction and reference to entries within memory that are manipulated by the transaction. The device also creates an in-memory log of the transaction in a first hash directory. The device then commits a copy of the first hash directory to a second hash directory maintained on a persistent memory device.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
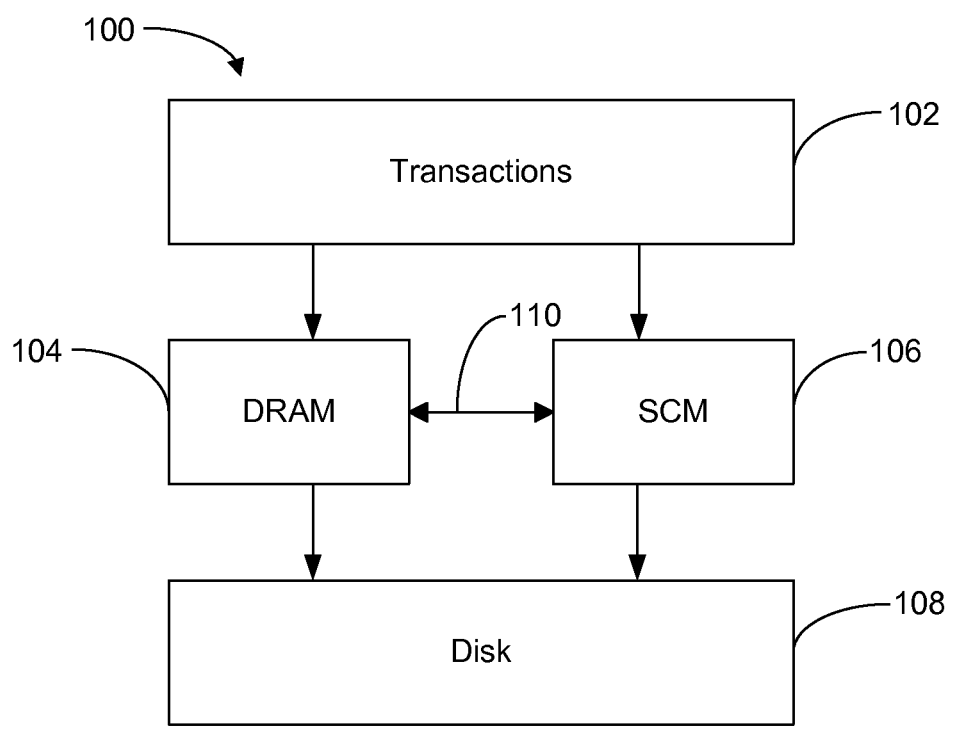
FIG. 1 depicts a schematic diagram of one embodiment of a system for processing and supporting transactions.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments include a device for processing and supporting transactions and committing transactions and data structures affected by those transactions to memory. A device receives a transaction and makes an in-memory log of that transaction in a hash directory in DRAM. Once the transaction is processed, a copy of the hash directory is committed to a persistent memory device, such as SCM or PCM. If there is an error or a system crash, the device is configured to roll back the transaction to either undo the transaction or rollback the transaction to a specific save point.

In some embodiments, the persistent memory device includes storage class memory (SCM). In one embodiment, the SCM device includes phase change memory (PCM). PCM is a high speed, non-volatile class of memory that allows the memory device and system to operate with high performance, data persistence, and high energy efficiency. PCM is also byte addressable, similar to DRAM, but because PCM is non-volatile, PCM may retain data without an applied voltage or power. While many of the systems and methods described herein are presented in PCM type devices, any persistent memory device may be used.

FIG. 1 depicts a schematic diagram of one embodiment of a system 100 for processing and supporting transactions 102. In one embodiment, a transaction 102 is processed on a system that includes a volatile memory device 104, such as DRAM and a persistent memory device 106, such as SCM. Some operations may be performed on the DRAM 104 while other operations are performed on the SCM 106. Furthermore, operations performed on the volatile memory device 104 need not necessarily be performed on DRAM technology, but rather any byte addressable and/or volatile memory device. In this description, many embodiments refer to the memory device 104 as DRAM, but may be performed on other types of memory other than DRAM. Likewise, the persistent memory device 106 may be any type of persistent memory device, such as SCM or PCM. In this description, many embodiments refer to a persistent memory device as SCM or PCM, but may be performed on other persistent memory devices other than those specifically described herein. In at least some embodiments, the SCM 106 and DRAM 104 may communicate 110 data for processing, storage, or retrieval purposes, including, for example, flushing data records from the DRAM 104 to the SCM 106 or indexing memory in the DRAM 104. The system 100 may also include a disk or storage device 108 for the storage of data during or after processing of transactions 102. In the illustrated depiction, the storage device 108 may interact with both the DRAM 104 and the SCM 106. In some embodiments, the system 100 may omit the disk storage 108 altogether and replace the storage with SCM 106 or another type of persistent memory.

In some embodiments, the SCM 106 may manipulate pieces of data as well as store data for later retrieval or storage purposes. In at least one embodiment, the SCM 106 may store data for long term preservation. Because the SCM 106 is non-volatile and capable of storing data long-term, the system 100 may be configured to avoid unnecessary interactions between the DRAM and persistent memory devices. Moreover, because interaction between the DRAM and SCM is so much faster than writing to disk storage, many of the latency issues due to the write/delete speed difference between DRAM and disk storage are reduced.

Figure 2:
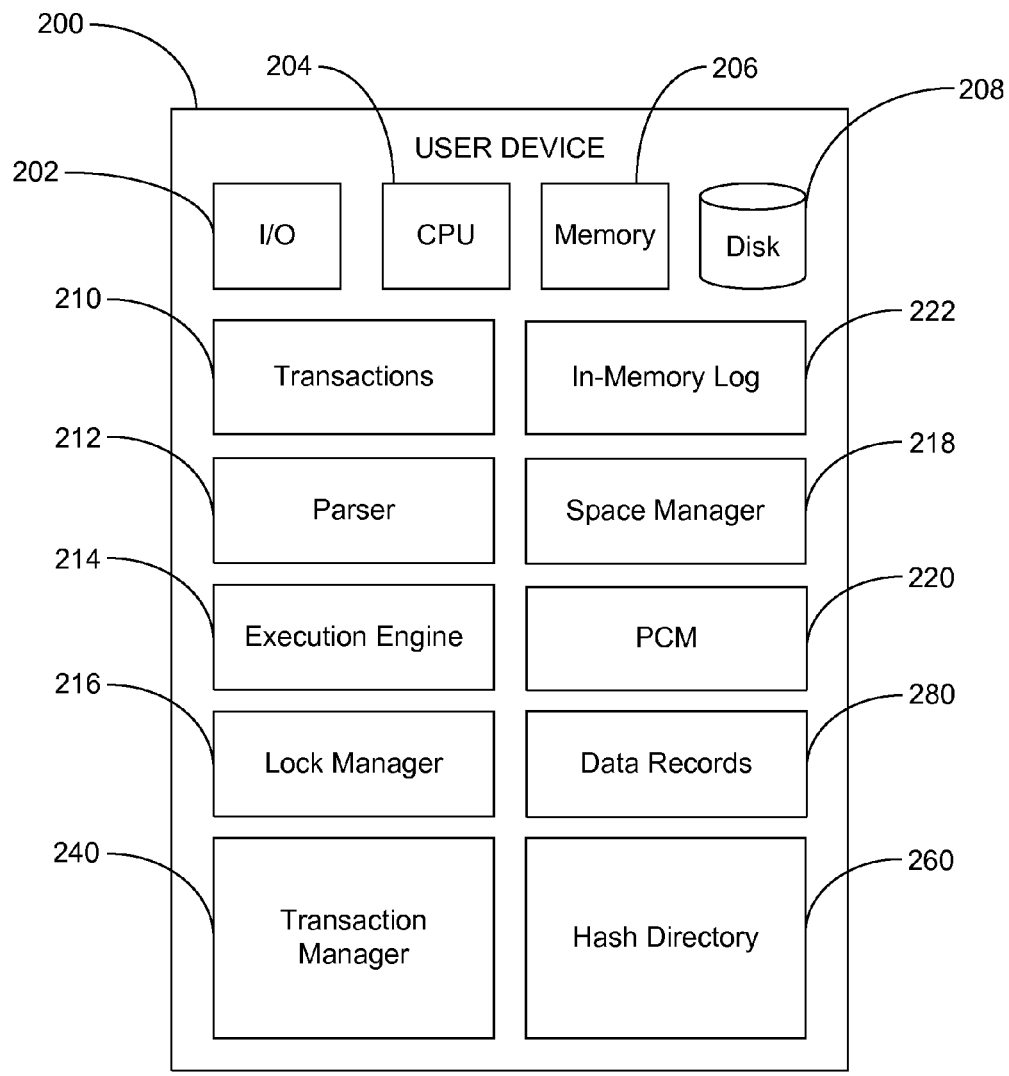
FIG. 2 depicts a schematic diagram of one embodiment of a user device which implements a system for processing and supporting transactions.

FIG. 2 depicts a schematic diagram of one embodiment of a user device 200 which implements a system 100 for processing and supporting transactions. In at least one embodiment, the user device 200 includes an I/O device 202, a CPU 204 for processing data, a memory device 206, and a disk 208. Embodiments of the device 200 may further include one or a combination of the following components: transactions 210, a parser 212, an execution engine 214, a lock manager 216, a space manager 218, phase change memory (PCM) 220, or other persistent memory, an in-memory log 222, a transaction manager 240, a hash directory 260, and references to data records 280. Also, in some embodiments, the transaction manager 240 and space manager 218 are maintained in persistent memory, for example in the PCM 220. Also, the hash directory 260 is maintained in the PCM 220, with a cached copy of the hash directory 260 maintained in memory, such as DRAM. In some embodiments, the device 200 may use fewer or more components than those illustrated herein, or may use any combination of components for supporting and processing transactions 210 on a computer readable storage medium. The components of the user device 200 are described in more detail herein in reference to their structures and functions performed on the device 200.

When processing and supporting a transaction 210, the device 200 receives a command and parses the command through a parser 212. The parser 212 parses the command into a query component of the command and a transaction component of the command, sending the query command to an execution engine 214 and a transaction component of the command to a transaction manager 240. While described in more detail in reference to FIGS. 3-5, the transaction manager 240 receives the transaction 210 and tracks and indexes the transaction 210 throughout the processing and support of that transaction 210 by the processor 204. During a normal transaction 210, the transaction manager 240 provides support for a transaction 210 in which data is tracked on a hash directory 260 on a memory device 206, such as DRAM, with a copy of the hash directory 260 being committed to memory on a persistent memory device, such as a the PCM 220. The support and processing of transactions 210 are described in more detail herein.

The device 200 may also be configured to support the rollback of data on a transaction manager 240 and a hash directory 260 in instances where the transaction 210 fails or the system crashes prior to committal of the hash directory 260 to the persistent memory. In this instance, the transaction manager 240 provides information related to the transaction 210, including indexing, deletion, save points, and other data related to the hash directory 260 and fields of data affected by a particular transaction 210. The device 200 may be configured to roll back the transaction 210, either undoing the transaction 210 or taking the transaction 210 to a prior state as indicated by a save point 252, to be continued prior to occurrence of the crash or failure of the transaction 210. Also during rollback of a transaction, the hash directory 260 cached in DRAM maintains a record of the fields of data records and other values affected by the transaction 210 and may be used for determining whether fields of data have been committed to the hash directory 260 maintained in persistent memory. This process of rollback is described in more detail herein.

The device 200 may further be configured to recover data potentially lost in a transaction crash or system failure or data lost during the rollback process. In this instance, the transaction manager 240 and hash directory 260 provide information related to previous transactions 210 supported by the device 200 as well as the current transaction 210 in progress. An in-memory log 222 containing data organized according to transactions 210 may be used to assist in the process of recovering data lost in the failure or crash of the transaction 210. This process of recovery may be performed by the device 200 for any transaction failure at any point during a normal transaction 210, during committal of a copy of a hash directory 260 to the PCM 220, during partial or complete rollback of a transaction 210, or even in response to a crash that occurs during the recovery of data.

Figure 3:
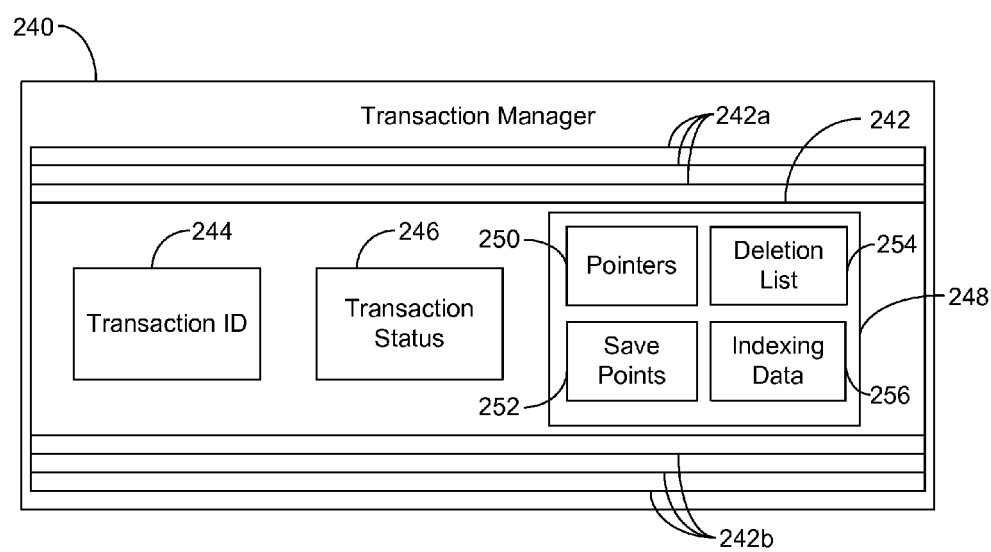
FIG. 3 depicts a schematic diagram of one embodiment of a transaction manager including a table of transaction entries.

FIG. 3 depicts a schematic diagram of one embodiment of a transaction manager 240 including a table of transaction entries. In at least one embodiment, the transaction manager 240 includes previous transaction entries 242a, a present transaction entry 242, and subsequent transaction entries 242b. In the illustrated embodiment, one specific transaction entry 242 is depicted. Further, the transaction entry 242 may include at least one of a combination of the following fields of data: transaction ID 244, transaction status 246, and a hash reference field 248. The hash reference field 248 may include pointers 250, save points 252, a deletion list 254, and other indexing data 256 that aid the transaction manager 240 in supporting a transaction 210 and processing data on a directory of hash entries 260. The transaction entries 242 and functions of the fields within the transaction entries 242, including interaction of the transaction manager 240 with other components of the device 200, are described in more detail herein.

Figure 4:
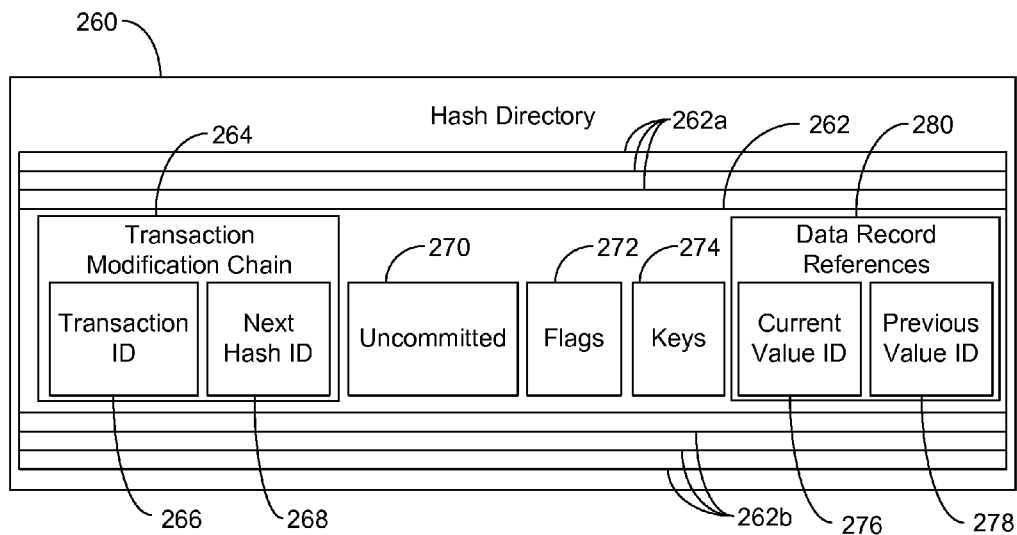
FIG. 4 depicts a schematic diagram of one embodiment of a hash directory including a table of hash entries.

FIG. 4 depicts a schematic diagram of one embodiment of a hash directory 260 including a table of hash entries 262. In at least one embodiment, the hash directory 260 includes previous hash entries 262a, a current hash entry 262, and subsequent hash entries 262b. In the illustrated embodiment, one specific hash entry 262 is more fully depicted. Further, the hash entry 262 may include at least one of a combination of the following fields of data: a transaction modification chain 264 including a transaction ID 266 and a Next Hash ID 268, an uncommitted array of data 270 specific to the a hash directory 260 maintained in memory, flags 272, key values 274, and references to data records 280 including a current value ID 276 and a previous value ID 278. While each of the fields within the illustrated hash entry 262 are depicted as being on a hash directory 260 maintained in DRAM or persistent memory, many fields, such as the uncommitted array of data 270 may be located in other data structures. For example, the uncommitted data 270 may be included elsewhere in memory other than the hash directory, and indexed by the hash directory 260 or the transaction manager 240. In one embodiment, the uncommitted array of data 270 is maintained at least partially as part of the indexing and other hash reference data 248 maintained on the transaction manager 240. Other embodiments may be utilized for optimization of space in DRAM or persistent memory or to simplify the design of the data management system 100 and ease of access to data. The hash entries 262 and functions of the fields within the hash entries 262, including interaction of the hash directory 260 with other components of the device 200 are described in more detail herein.

Figure 5:
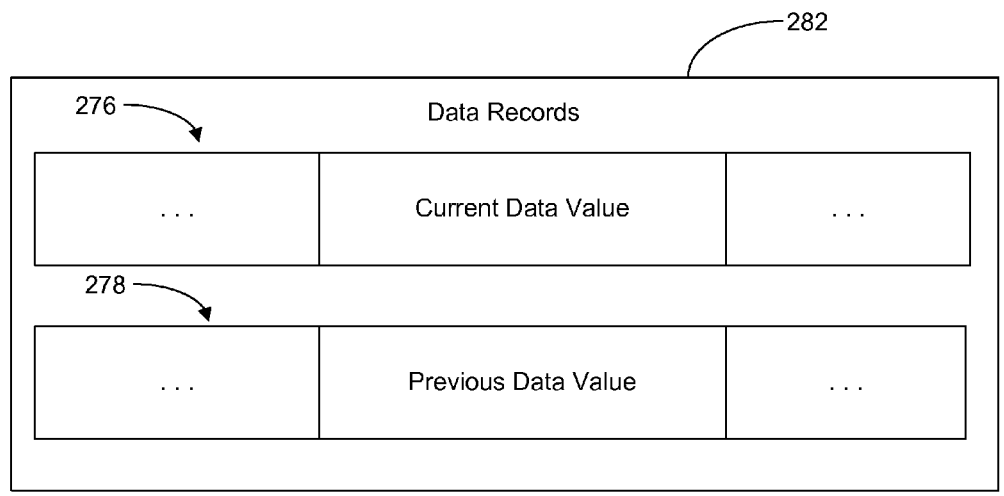
FIG. 5 depicts a schematic diagram of one embodiment of a number of data records that may referenced by a hash entry.

FIG. 5 depicts a schematic diagram of one embodiment of a number of data records 282 that are referenced in a hash entry 262. Corresponding to the current value ID 276 of the hash entry 262 is a first data record 276, which has the current data value. Corresponding to the previous value ID 278 of the hash entry 262 is a second data record 278, which stores the prior committed data value. Within each of the data records 276, 278 are a number of fields with referencing and informational data about the current and previous transactions for recovery and rollback purposes. These data records 276, 278 are described in more detail herein.

Figure 6:
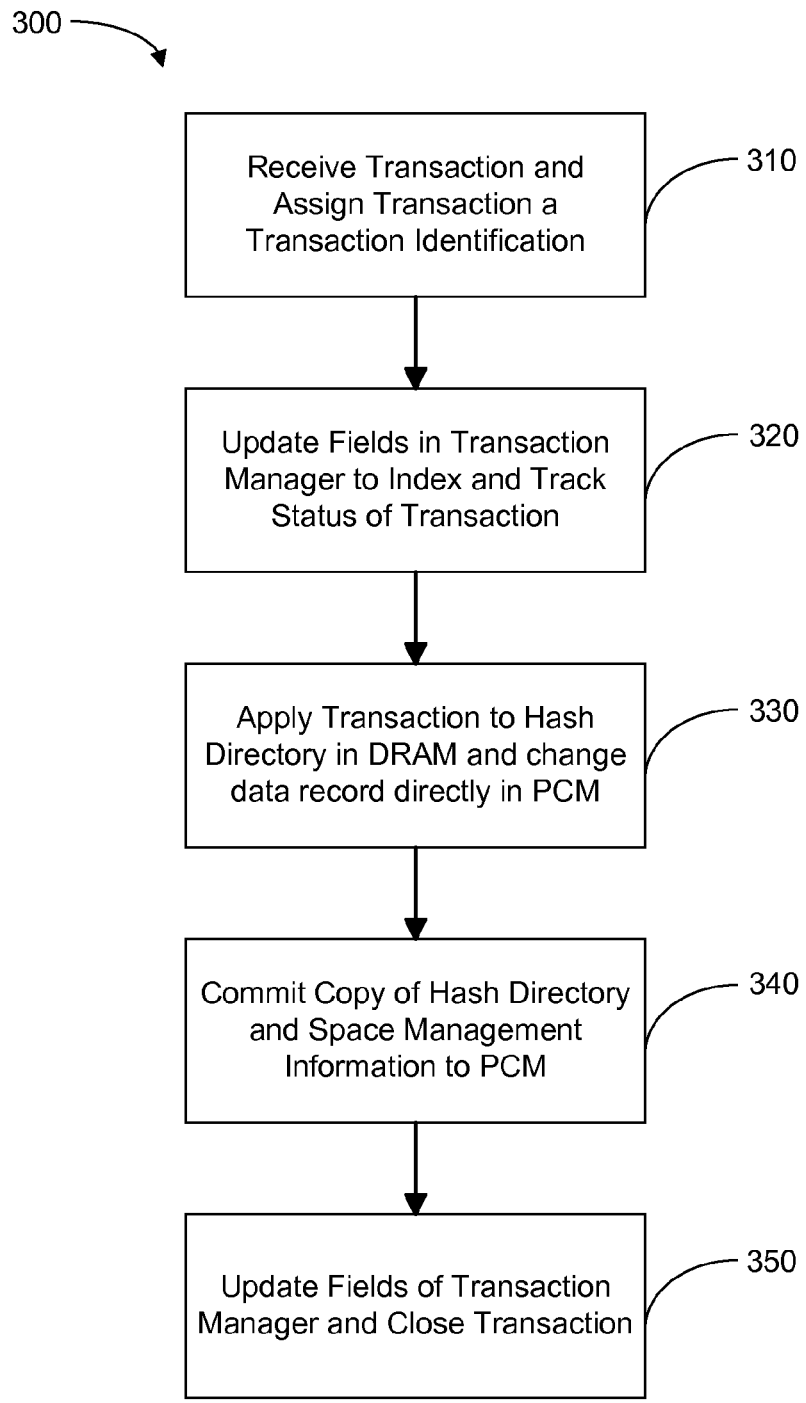
FIG. 6 depicts flowchart of one embodiment of a method for processing and supporting transactions.

FIG. 6 depicts a method of a flowchart of one embodiment of a method 300 for processing and supporting a transaction 210. During a normal transaction 210, the device 200 receives a command and parses that command into a query component and a transaction component by a parser 212.

The query component of the command goes to an execution engine 214 while the transaction component of the command is sent to the transaction manager 240. The transaction manager 240 provides support for the processing of the transaction 210. The transaction manager 240 receives 310 the transaction 210 and assigns the transaction 210 a transaction ID 244. The transaction manager 240 updates 320 fields for that particular transaction entry 242, and stores the transaction entry 242 in a table of transactions 242a-242b in the transaction manager 240. The transaction entry 242, once assigned a transaction ID 244, tracks the progress of that transaction 210, including assigning the transaction 210 a transaction status 246, and keeping a record of processing performed during the course of that transaction 210. Further, in each transaction 210, data records 282 and other values and items changed by a transaction 210 may be tracked or stored in references to data records 280 in the hash directory 260. In at least one embodiment, the transaction manager 240 is stored in PCM 220 and interacts with an in-memory hash directory 260, which is located and maintained in PCM and cached in DRAM.

In addition to assigning the transaction ID 244 to a particular transaction entry 242, the transaction manager 240 may scan the in-memory hash directory 260, or a copy of the hash directory 260 maintained in PCM 220, to find the first available hash entry 262. This may be done by scanning hash entries 262 and determining whether that particular hash entry 262 is currently in use, whether the hash entry 262 has even been used or deleted, or whether the hash entry 262 has been used by a previous transaction 210. In some embodiments, the transaction manager 240 may also determine the history of transactions 210 by referring to the deletion list 254 or other indexing data 256 which is maintained in the transaction manger 240 or by accessing data on the hash directory 260 in PCM 220. In maintaining a record of whether a hash entry 262 has been manipulated, the hash directory 262 includes a flag field 272 to indicate a history of use of that hash entry 262 or to indicate whether a particular operation is an update, delete, insert, or other type of operation. For example, in one embodiment of a hash entry 262, the flags entry 272 may have three data bits (Flags) to indicate the history of writes and deletes of that entry 262. In one embodiment, the first flag, or Ever_Deleted bit, may indicate whether that entry has ever been used in a previous transaction 210. The second flag, or Deleted_Bit, may indicate if a data item or value is currently deleted by the present transaction. If the data item has been deleted by a current transaction 210, it is so indicated in references to the data item maintained in the data records 282. The third flag, the In_Use_Bit, may indicate if the hash entry 262 is currently in use. To facilitate more efficient processing, and longer cell-life of the PCM 220 and other memory, the transaction manager 240 may be configured to not use arrays of data that have been used previously, in an effort to avoid excessive writes or deletions of particular bits of data and better utilize the space of the persistent memory.

Once assigned a transaction ID 244, the transaction entry 242 further tracks the status of the transaction 210 in a transaction status field 246. The transaction status 246 may be set by the transaction manager 240 to be one of several transaction statuses 246, including, for example, "started, committing, rollback, committed, aborted," or other status to indicate the progress of a particular transaction 210. In at least one embodiment, upon assigning a transaction ID 244, the transaction manager 240 sets the transaction status 246 of a particular transaction 210 to 'started' to indicate that a transaction 210 is underway, and applies 330 changes directed by the transaction 210 to a hash directory 260 maintained in DRAM.

Also upon starting a transaction 210, the transaction manager 240 may track the manipulations performed on specific entries 262 within the hash directory 260. For example, the transaction field 242 may include multiple fields of hash reference data 248 which may include data related to individual or chains of hash entries 262 affected by a particular transaction 210. The hash reference field 248 may include a field of pointers 250, a field of save points 252, a deletion list 254, and other indexing data 256. The pointers 250 may include data referencing certain hash entries 262 or data fields within hash entries 262 marking where certain stages of a transaction 210 begin or end, or in some cases marking points at which hash entries 262 have been committed to PCM 220. For example, in at least one embodiment, a pointer 250 may indicate the first hash entry 262 affected by a particular transaction 210. Another pointer 250 may indicate the final hash entry 262 affected by a particular transaction 210, giving the transaction manager 240 an indication of where to begin a subsequent transaction 210 without inefficiently searching an entire hash directory 260. The hash reference field 248 may also include save points 250, indicating other points within a transaction 210 that may be useful to draw upon. For example, a save point 252 may refer to a point on the transaction manager 240 or hash directory 260 where the transaction status 246 of a particular transaction 242 changed status. Furthermore, the transaction manager 240 may also track other data related to the hash directory 260, for example, the active hash entry 262 being affected by a transaction 210, any previous or subsequent hash entries 262a, 262b affected or scheduled to be affected by a transaction 210, or any other indexing data 256 that may be useful in efficiently processing and storing data associated with a transaction 210.

After a transaction 210 has been commenced, the transaction status 246 has been updated to 'started', the transaction ID 244 has been assigned, and the hash referencing fields 248 of the transaction entry 242 have been updated, the transaction manager 240 may continue to update the transaction entry 242 and fields within the transaction entry 242 as the data within the hash directory 260 is processed. Note also that prior to flushing or committing data from the hash directory 260 to a copy of the hash directory 260 maintained in PCM 220, the manipulations performed by the transaction 210 on the hash directory 260 are performed on the hash directory 260 cached in DRAM.

Upon completion of the operations associated with commencing or starting a particular transaction 210, the transaction manager 240 will change the transaction status 246 to 'committing' and begin committing 240 a copy of the in-memory hash directory 260 to a hash directory 260 maintained in PCM. Because the hash directory 260 maintained in PCM 220 has not been altered by the present transaction 210, the hash directory 260 maintained in PCM 220 and the hash directory 260 cached in DRAM are out of sync, and the hash directory 260 is flushed to PCM 220 to sync the in-memory hash directory 260 as it exists post transaction with the version of the hash directory 260 prior to the commencement of the transaction 210. In flushing the data from DRAM to PCM 220, the transaction manager 240 follows the transaction modification chain 264 in the hash directory entry 262 checking the current value ID (CVID) field 276 and the previous value ID (PVID) fields 278 to determine if that hash entry 262 has been changed by the transaction 210. If either the CVID 276 or PVID 278 is set at anything other than zero, the hash entry 262 is copied to the corresponding hash directory 260 maintained in PCM 220. If the values of both the CVID 276 and PVID 278 are set at zero, then the hash entry 262 is skipped, because the entries are already in sync.

The transaction manager 240 also directs the space manager 218 to update its data related to the space available in persistent memory. The space manager 218 manages space allocation and deallocation of PCM memory by a transaction 210. In some embodiments, the space manager 218 is a stand-alone device for tracking the space of the PCM 220. In some embodiments, the space manager 218 is part of the hash directory 260, and in some instances may be maintained as part of the uncommitted free list of data 270 for tracking the usage of space on the hash directory 260. Further, in some embodiments, the space manager 218 may be implemented in the transaction manager 240 maintaining space records of the hash directory via the indexing data and other hash reference data maintained therein. Also, in some embodiments, metadata used by the space manager 218 as well as other data on the space manager 218 is maintained at least partially in PCM and updated dynamically with the hash directory 260, either in the DRAM or the PCM 220. Further, information and other data maintained by the space manager 218 may be cached in DRAM throughout the support and processing of transactions 210. After the hash directory 260 and the space manager 218 are synced to the PCM 220, the transaction status 246 changes to 'committed' to indicate completion of the committal process.

Upon completion of syncing copies of the hash directory 260 and space management data to the PCM 220, the transaction status 246 is changed to 'committed', and the transaction manager 240 frees the record maintained in the save points 252. The transaction manager 240 directs the uncommitted data from the DRAM to the space manager 218 maintained in PCM 220 prior to deleting the data cached on the DRAM during the transaction 210. The transaction manager 240 then updates 350 the fields of the transaction manager by going through the deletion list 254, pointers 250 and other indexing data, and updating the pointers 250 and indexing data 256 stored in the transaction entry 240 to correspond with the current status for that particular transaction 210. The transaction manager 240 also directs all the locks on data held by the current transaction 210 to be released for use by subsequent transactions 210. The transaction manager 240 then removes the transaction 210 from a list of active transactions 210 maintained by the transaction manager 240. Assuming there are no crashes or prompts for recovery of data, the transaction history is maintained in the transaction manager 240, and information on the DRAM no longer needed to support the transaction 210 is deleted. The transaction status 246 remains 'committed' or may be changed to another status to indicate that the transaction 210 is complete.

In one embodiment, the device 200 may be configured to respond to a system failure, committal failure, or some other type of event that would require the device 200 to roll back a transaction 210 to a state prior to receiving and processing the transaction 210. In rolling back a transaction 210 where the rollback process is triggered by a failure during committal of the transaction 210, some, but not all changes to the hash directory on DRAM may have been made to the copy of the hash directory 260 in PCM 220. In rolling back this transaction 210, changes are made to the transaction entries 242 within the transaction manager 240, the in-memory hash directory 260, the PCM hash directory 260, and space management data on the PCM 220. The steps in making these changes in a transaction rollback are described herein.

Figure 7:
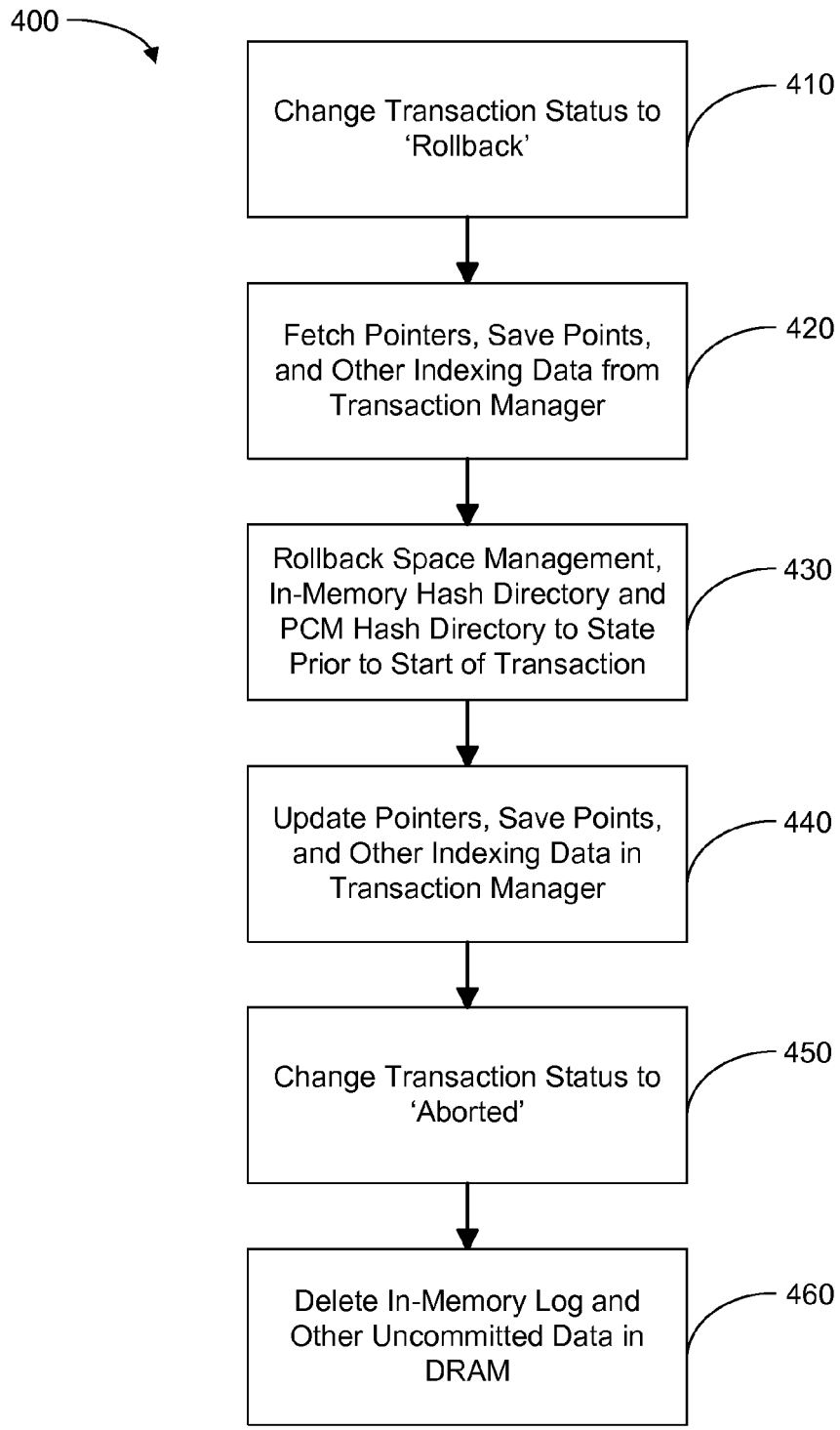
FIG. 7 depicts a flowchart of one embodiment of a method for rolling back a transaction.

FIG. 7 depicts a flowchart of one embodiment of a method 400 for rolling back a transaction 210. In rolling back a transaction 210, the transaction manager 240 changes 410 the transaction status 246 to 'rollback' to indicate to other components of the system 100 that the device 200 is no longer committing a transaction 210 to the PCM 220, but rather rolling back that transaction 210. The transaction manager 240 also retrieves 420 several relevant hash entries 262 affected by the current transaction 210, including the most recent and first affected hash entry 262 affected by the present transaction. Also, because of the hash reference data fields 248, the transaction manager 240 may also provide data regarding other relevant reference points, such as save points 252 or other pointers 250 as directed by the transaction manager 240.

The transaction manager 240 then rolls back each of the items written to the PCM 220, including changes made to the hash directory 260 and space manager 218 on the PCM. This is done by retrieving the first data value or metadata item affected by the transaction 210 from the transaction manager 240 and following the transaction modification chain 264 by rolling back 430 the changes to the hash directory 260 one entry at a time in reverse order. In some embodiments, during rollback, data from the PCM hash directory 260 and space manager 218 may also be rolled back to a state prior to the start of a transaction 210. During rollback, the data of each entry 242 is scanned in a recovery process to determine whether hash entries 262 have been entirely written to the PCM 220 as well as making sure the in-memory data matches the data written to the PCM 220. This may be done through an algorithm described herein in regards to the rollback recovery process.

In addition to rolling back the changes made to the PCM 220, and rolling back the changes made to the in-memory hash directory 260, during rollback, the transaction manager 240 further instructs that all locks on hash entries 262 and data fields related to the transaction 210 are released. The transaction manager 240 updates 440 the pointers 250, save points 252, deletion list 254 and other indexing data 256, and changes 450 the transaction status 246 to 'aborted,' officially marking the end of the transaction 210. Once the transaction 210 is aborted, the uncommitted free list 270 is cleared, the in-memory logs for the transaction 210 are discarded 460, and the device 200 is prepared to receive and support subsequent transactions 210.

The system 100 may also be configured to recover data during rollback of the transactions 210. This is done through an algorithm geared at comparing a log of the transaction 210 maintained in-memory as well as any data committed to the PCM 220. In some cases, the recovery process determines whether data has been flushed to the PCM 220 correctly and recovers data lost as a result of the trigger of the rollback process. It may also be useful to verify the accuracy of the transfer of data from the DRAM to the PCM 220. In some cases, such as a system crash, the recovery process may be an undo process for restoring directories 260 in the PCM 220 and the DRAM to their states prior to receiving and processing the transaction 210. In some embodiments, the device 200 provides undo-only recovery for the system 100 after a crash. This undo-only recovery is applicable for any failures that may happen during normal query execution, partial rollback, transaction rollback, and even crashes that occur during recovery. The method of recovery, including steps and rollback algorithm are described herein.

One procedure of the rollback process is recovering lost data and scrolling through the in-memory hash directory 260 of the transaction 210 to verify consistency between the data cached in memory and the data committed to the PCM 220. In scrolling through the directories and performing the rollback process, the transaction manager 240 follows the chain of transactions 210 by following the transaction modification chain 264 as well as denoting data in the references to data records 280 of the hash directory 260. In recovering this data, the transaction manager 240 scans the hash entries 262 in reverse chronological order of how they were affected by a transaction 210. Starting with the latest hash entry 262, and following the chain of hash entries 262 in reverse order as indicated by the fields within the hash entry modification chain 280, the hash entries 262 on the PCM 220 and the DRAM are compared to verify whether each hash entry 262 has been properly committed to the PCM 220. If at any point the transaction modification chain 264 and information referenced on the transaction manager 240 are out of sync, indicating that the hash entry 262 and transaction manager 240 don't match, then the mismatched hash entry 262 is likely not affected by the present transaction 210 and recovery should stop. Otherwise, the transaction 210 should roll back to the end of the chain of hash entries 262 until the rollback process is complete, and the transaction status 246 is changed to 'aborted.'

One method of determining whether the hash entry 262 under review has been copied from the DRAM to the PCM 220 in its entirety is by scanning the value of the flags 272 in the hash directory 260. As discussed above, the flags entry 272 may contain three values, including (1) an Ever_Delete value, (2) a Delete_Bit value, and (3) an In_Use_Bit value. By way of example, a hash entry 262 corresponds to a data record 282, such as a database record or key-value store record. If a hash entry 262 is free or available for use, the In_Use_Bit is 0. If it is in use or otherwise locked, it is 1. If a data record 282 is deleted by an active transaction 210, the Delete_Bit in the corresponding hash entry 262 is set to 1. If a hash entry 262 has ever been deleted since the inception of the hash directory 260, then the Ever_Delete value is set as 1. For example, each flag entry 272 may be set to "000" initially. If a transaction 210 makes use of a hash entry 262, the flag is changed to "001" to indicate the hash entry 262 is in use. If a transaction 210 then deletes the record, the flag entry 272 is changed from "001" to "011" in DRAM and then to "010" when the transaction 210 commits to persistent memory. If a subsequent transaction 210 then makes use of the hash entry 262, the flag entry 272 is changed from "010" to "101" when the transaction 210 commences, indicating that the hash entry 262 is now in use and has been deleted at some point by a prior transaction 210.

In addition to scanning flag values 272, fields between the hash directory 260 and data committed to the PCM are compared by scanning the transaction sequence number (TSN) or transaction ID 244 values. By way of explanation, the transaction ID 244 may be denoted by difference values, including a transaction TSN (Trans_TSN), Item TSN (Item_TSN), and Record TSN (Record_TSN) for assisting the transaction manager 240 in the restart recovery and rollback processes. By way of example, for a given transaction to be processed in a restart recovery, its TSN is denoted as Trans_TSN. If a specific hash entry 262 is changed by a present transaction 210, then the transaction ID 244 associated with the specific hash entry 262 is denoted by Item_TSN. The TSN stored with the data record, residing in the persistent memory, is denoted as Record_TSN. If hash entry 262 and other data values have been committed entirely to the PCM, then the Trans_TSN, Item_TSN, and Record_TSN will have the same TSN value. If their values are not the same, then the transaction manager 240 may detect at which point the committing process has been done for a specific transaction 210 and thus require a specific rollback procedure for restart or recovery of the transaction 210.

If, during rollback of a transaction 210, the flag value is 000, then the system is recovering from a crash of a previous recovery process. Otherwise, the flags would be something other than zero if the item belongs to a committing transaction. In this case, the transaction manager 240 changes the transaction sequence number to −1 and continues in the transaction modification chain 264 to the next hash entry 262.

If the flag is 1 (001), the operation is an insert or an update. Therefore, the CVID 276 should be larger than −1 if the copy was complete. In dealing with a flag value of 001, there are two possible cases. If the CVID 276 is less than 0, the copy to the PCM is incomplete. Thus, the CVID 276 is its old value prior to committal, also meaning that the entry wasn't used prior to the transaction. Thus, the flag should be reset to zero, and the Item_TSN to −1. The transaction manager 240 then proceeds to the next entry. If the CVID 276 is greater than or equal to 0, the item is possibly complete. To further decide whether the copy is complete, the Trans_TSN and Record_TSN are compared by following the CVID 276. If the Trans_TSN and Record_TSN are equal, the copy is complete. Further, if the PVID 278 is not zero, the transaction is an update, otherwise it is an insert. For an update operation, the CVID 276 and PVID 278 are compared. If they are not equal, the data record 282 pointed to by the CVID 276 is freed. If they are equal, the TSN is set to −1. For an insert operation, the data record 282 pointed to by the CVID 276 is freed and the CVID is set as −1. The flags are set to 0 and the TSN is set to −1. Finally, if the Trans_TSN and the Record_TSN don't match, it means the item has not been completely copied, the CVID 276 is the old value, and the operation is an update. The processing is ceased and the transaction manager 240 proceeds to the next entry in the transaction modification chain 264.

If the flag is 2 (010), there is only one possibility of previous flag values, 001, indicative of a delete operation. If the CVID 276 is 0, the copy to the PCM 220 is complete. The PVID 278 is copied to the CVID 276, the flags are set to 001 and the TSN is set to −1. If the CVID 276 is greater than or equal to 0 and the PVID 278 equals the CVID 276, indicating recovery from a crash, the flags are set to 001 and the TSN is set to −1. In all other cases where the flag is 010, the copy to the PCM 220 is incomplete, as the CVID 276 needs to be −1 for a delete operation. The CVID 276 has its old value, and does not need to be restored. The flags are set to 001 and the TSN is set to −1.

If the flag is 5 (101), the operation could be an insert or an update. The initial flags could have been 010, 110, or 101. For flag values of 010 and 110, the flag can be restored 110 because after one commit, 010 will be 110 in any case. In other scenarios, the CVID 276 is checked for determining whether the copy to the PCM 220 is complete. If the CVID 276 is less than zero, the copy is incomplete and the CVID 276 is still its old value prior to committal. Because the CVID 276 is less than 0, it cannot be an update, therefore, the flags are set to 110 and the TSN is set to −1. If the CVID 276 is greater than or equal to 0, the copying of the entry is possibly complete, and the Trans_TSN is compared to the Record_TSN, similar to the algorithm dealing with a flag entry of 001, as discussed above. If the Trans_TSN and Record_TSN are equal, the copy is complete, and the insert or update is detected by checking the PVID 278. For an update, compare if the CVID 276 is equal to the PVID 278. If not, free the data record 282 pointed to by the CVID 276 and copy the PVID 278 to the CVID 276 and set the TSN to −1. If they are equal, set the TSN to −1 without changing any flags. For an insert, free the data record 282 pointed to by the CVID 276, set the CVID 276 as −1, and set the flags to 110 and TSN to −1. If the Trans_TSN and Record_TSN are not equal, the copying failed. CVID 276 is its old value, and the operation is an update. The entry is not processed any further.

If the flag is 6 (110), there is a starting flag possibility of 101, and the operation is either delete or restart after partial restart recovery. The algorithm is similar to a flag entry of 010 described above, except that the flags are set back to 101 instead of 001. In the case of restart after partial recovery, the Item_TSN of the entry is −1, different from the Tran_TSN.

The device 200 may further be configured to provide functions for in-memory logging and partial rollback of a transaction, referenced in some detail above, and described in more detail herein. In a partial rollback of a transaction 210, the transaction 210 is partially complete and rolled back to a save point 252 indexed by the transaction manager 240. As described above, the save points 252 may include a list of points maintained in the transaction maintained in either DRAM or in the PCM 220. By way of example, the transaction manager 240 may include different kinds of save points 252, including the tail of the chain of hash entries 262 affected by a current transaction 210, the expected tail of the hash chain affected by a current transaction 210, the tail of the uncommitted free list 270 for the transaction 210, the tail of the delete list 254, the tail of the log, the location and identification of the save points 252, or any other point that may be used in processing, supporting, rolling back, or recovering data from a transaction 210.

The device 200 may further be configured to maintain an in-memory log 222 of the transaction 210 in the main memory of the device 200. Specifically, the device 200 is configured to log operations of insert, update, and delete. Each log contains multiple records, corresponding to individual statements. In at least one embodiment of the in-memory log 222, each log includes values such as 'type', 'position', and 'last version'. The type value indicates whether the data operation is an insert, update, delete, or other type of operation. The position value records the hash directory position of the item, enabling efficient item lookup, particularly during rollback of a transaction. The last version value stores the CVID 276 of the item before the statement is executed. In cases where the data record 282 affected by a transaction 210 is just inserted, the last version value is zero.

In addition to general rollback functions, the device 200 may further be configured to restore the hash directory 260 in the main memory for each item modified by the transaction 210 after different save points 252. This process is generally referred to as partial rollback, because the transaction 210 is partially rolled back to a save point 252 without rolling back the entire transaction 210 described below.

In partial rollback, the in-memory hash directory 260 is restored up to the save point 252 similar to the process of transaction rollback, starting at the tail of the in-memory hash directory 260 as indicated by the save point 252. The flag values 272 are then scanned for determining types of operations and what data needs to be restored to the hash entries 262 of the hash directory 260.

For a flag value of 001, the flag either started the transaction as a 000 or 001. If the last version of the log is a −1, the operation was an insert, otherwise, the operation is an update. The flag values are reset and the current CVID 276 is added to the delete list 254. If the operation is an update, the CVID 276 is replaced with the last version value saved in the in-memory log 222. If the operation is an insert, the CVID 276 is reset to −1.

For a flag value of 010, the flag started the operation as 001, and the operation was a deletion. The last version of the CVID 276 is copied to the hash directory 262. If the last version is −1, an error is reported. The flag value is also reset to 001.

For a flag value of 011, the flag indicates an intermediate state of a deletion from a flag value of 001. The flag value is reset to 001 and the PVID 278 is copied to the CVID 276 in the respective hash entry 262.

For a flag value of 101, the flag indicates a starting value of 010, 110, indicating an insertion, or a 101 indicating an update operation. To determine whether the operation is an insertion or update, the PVID 278 is checked. If the PVID 278 is −1, then it is an update, the CVID 276 is added to the delete free list (unlocked?), and the CVID 276 is restored from the last version, and the flag value remains unchanged. If the operation is an insert, the CVID 276 is unlocked and restored to the PVID 278 value, and the flag is reset to 110.

For a flag value of 110, the starting flag would be 101, indicating a deletion operation. The CVID 276 is restored to the PVID 278 value, and the flags are reset to 101.

For a flag value of 111, the flag indicates an intermediate state from 101 to 110. Similar to a flag value of 110, the CVID 276 is restored to the PVID 278 value, and the flag value is reset to 101.

After scanning the flag values 272, the save points 252 are updated to remove all entries after the original save point 252 used for determining the tail end of the transaction chain. All save points 252 after the original save points 252 are no longer outstanding and may be deleted. The uncommitted free list 270 is then restored from the save point 252, and space in the uncommitted list 270 after the save point 252 is released.

The chain of hash entries 262 is then restored to the original state. The save point 252 is changed to correspond to the end of the restored chain of hash entries 262. Other save points 252 may also change or remain the same depending on the entries affected by the rollback process. The transaction manager 240 follows the tail position stored with the save point 252, compares the next hash entry field of that hash entry 262 to see if the next entry is nil, and then sets the next hash entry 262 to nil to complete the partial rollback of the transaction 210.

In some embodiments, the starting address and tail of the in-memory hash directory are maintained for each transaction being processed. This and other metadata of the in-memory log 222 may be stored in a per-transaction data structure, managed by the transaction directory, and stored in the PCM.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a system for supporting transactions includes at least one processing unit coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Embodiments of the invention can take the form of an entirely hardware embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product, comprising:
a non-transitory computer readable storage medium to store a computer readable program, wherein the computer readable program, when executed by a processor within a computer, causes the computer to perform operations for executing and supporting transactions, the operations comprising:
receiving a transaction comprising a command and data;
writing the data to a transaction manager on a persistent memory device, wherein the transaction manager maintains a status of the transaction and reference to entries within the memory that are manipulated by the transaction;
creating a log of the transaction in a hash entry, wherein the hash entry is in a first hash directory comprising a table of hash entries, and committing a copy of the first hash directory to a second hash directory, wherein the second hash directory is a copy of the first hash directory; and
maintaining a status of each hash entry in a corresponding flag field, wherein a flag field comprises data indicating an ever-deleted status of a corresponding hash entry, and wherein the second hash directory is on the persistent memory device.

2. The computer program product of claim 1, wherein the persistent memory device is a storage class memory device comprising phase change memory, wherein the persistent memory device is byte addressable.

3. The computer program product of claim 1, wherein the computer readable program, when executed on a computer, causes the computer to perform additional operations comprising:
maintaining a record of indexing information on the transaction manager, wherein the record of indexing information comprises data related to at least one hash entry within the first and second hash directories affected by the transaction.

4. The computer program product of claim 1, wherein each flag field comprises data indicating one of an in-use status, deleted status, and ever-deleted status of corresponding hash entries, and wherein the hash entry comprises one of a combination of: a transaction modification chain; an uncommitted array of data specific to the hash directory; a flag; key values; and references to data records.

5. The computer program product of claim 1, wherein the computer readable program, when executed on a computer, causes the computer to perform additional operations comprising:
rolling back a transaction on the first and second hash directories, wherein rolling back the transaction comprises:
determining whether entries of the first hash directory have been committed to the second hash directory; and
returning the first and second hash directories to a state prior to the start of the transaction.

6. The computer program product of claim 1, wherein the computer readable program, when executed on a computer, causes the computer to perform additional operations comprising:
creating at least one save point in the transaction manager, wherein the save point corresponds to a hash entry on the first or second hash directory where each of the hash entries affected by the transaction prior to the save point have been committed to the second hash directory.

7. The computer program product of claim 6, wherein the computer readable program, when executed on a computer, causes the computer to perform additional operations comprising:
rolling back a transaction on the first and second hash directories, wherein rolling back the transaction comprises:
determining whether entries of the first hash directory have been committed to the second hash directory; and
returning only the entries of the first and second hash directory after the at least one save point to a state prior to the start of the transaction.

8. A transaction support system, comprising:
a persistent memory device;
a manager for receiving and supporting transactions, wherein the manager writes data from a transaction to the persistent memory device and wherein the manager maintains a status of the transaction and references to entries in a memory device affected by the transaction;
a first hash directory to create a log of the transaction in a hash entry, wherein the hash directory comprises a table of hash entries;
a second hash directory maintained in persistent memory, wherein the second hash directory is at least partially a copy of the first hash directory, and wherein the second hash directory is committed to persistent memory by the manager for receiving and supporting transactions; and
a flag field corresponding a status of each hash entry within the first and second directories, wherein one flag field comprises data indicating an ever-deleted status of the corresponding entry within the first and second directories.

9. The transaction support system of claim 8, wherein the persistent memory device is a storage class memory device comprising phase change memory, wherein the persistent memory device is byte addressable.

10. The transaction support system of claim 8, wherein the manager for receiving and supporting transactions maintains a record of indexing information on the first and second directories, wherein the record of indexing information comprises data related to at least one entry within the first and second directories affected by the transaction.

11. The transaction support system of claim 8, wherein the hash entry comprises one of a combination of: a transaction modification chain; an uncommitted array of data specific to the hash directory; a flag; key values; and references to data records, and wherein each flag field comprises data indicating one of an in-use status, deleted status, and ever-deleted status of corresponding entries within the first and second directories.

12. The transaction support system of claim 8, wherein the manager for receiving and supporting transactions is further configured to determine whether entries of the first directory have been committed to the second directory and returning the first and second directories to a state prior to the start of the transaction.

13. The transaction support system of claim 8, wherein the manager for receiving and supporting transactions maintains at least one save point, wherein the save point corresponds to an entry on the first or second directory where each of the previous changes to the first directory prior to the save point have been committed to the second directory.

14. The transaction support system of claim 13, wherein the manager for receiving and supporting transactions is further configured to:
   determine whether entries of the first directory have been committed to the second directory; and
   return only the entries of the first and second directories after the at least one save point to a state prior to the start of the transaction.

* * * * *